United States Patent [19]

Uhi

[11] 3,854,075

[45] Dec. 10, 1974

[54] MINIATURE METALIZED FILM CAPACITOR

[75] Inventor: John Phillip Uhi, Arlington, Va.

[73] Assignee: Illinois Tool Works, Inc., Chicago, Ill.

[22] Filed: Nov. 29, 1973

[21] Appl. No.: 420,236

[52] U.S. Cl. ............... 317/260, 29/25.42, 317/260
[51] Int. Cl. ............................................. H01g 1/14
[58] Field of Search ................... 317/242, 260, 261; 174/68.5; 24/25.42

[56] References Cited
UNITED STATES PATENTS

| | | | |
|---|---|---|---|
| 1,984,785 | 12/1934 | Deutschmann | 317/242 |
| 2,470,826 | 5/1949 | McMahon | 317/242 X |
| 2,766,510 | 10/1956 | Heibel | 317/242 X |
| 2,987,800 | 6/1961 | Kurland | 317/242 X |
| 3,241,014 | 3/1966 | Rubinstein | 317/261 X |
| 3,622,847 | 11/1971 | Grahame | 317/260 X |
| 3,663,923 | 5/1972 | Primoff | 174/68.5 |
| 3,715,784 | 2/1973 | Rayburn | 317/260 |

FOREIGN PATENTS OR APPLICATIONS

| | | | |
|---|---|---|---|
| 578,487 | 7/1946 | Great Britain | 317/260 |
| 586,170 | 12/1958 | Italy | 317/260 |

Primary Examiner—E. A. Goldberg

[57] ABSTRACT

The embodiment of the invention disclosed herein is directed to a capacitor and the method of making such capacitor. The capacitor can be wound and includes a layer of dielectric material metalized surfaces disposed on both sides of the layer of dielectric material. A metal foil contact member is placed in contact with the metalized surfaces and a lead wire member having a pair of closely spaced apart bight portions formed at one end thereof engages the metal foil and further has a bight portion formed at the other end thereof ultimately to be severed to form independent lead wires for the wound capacitor. The lead wire member can serve as a mandrel upon which the length of dielectric material and the metalized surfaces thereof are wound.

5 Claims, 25 Drawing Figures

PATENTED DEC 10 1974
3,854,075
SHEET 1 OF 3
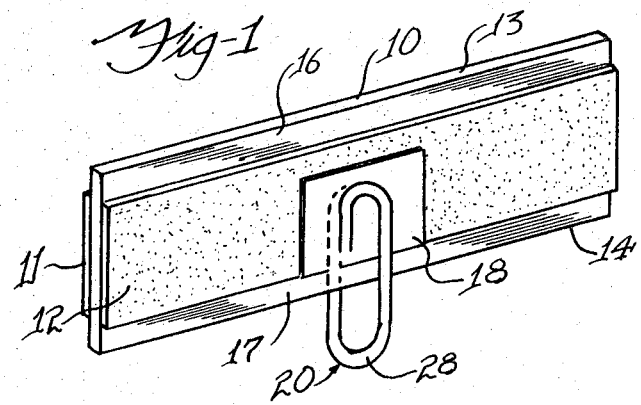
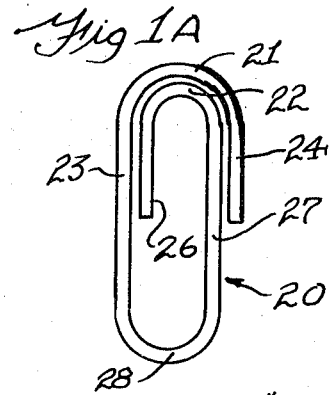
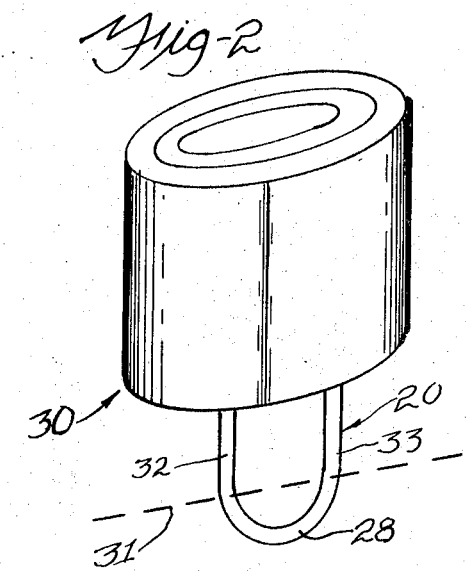
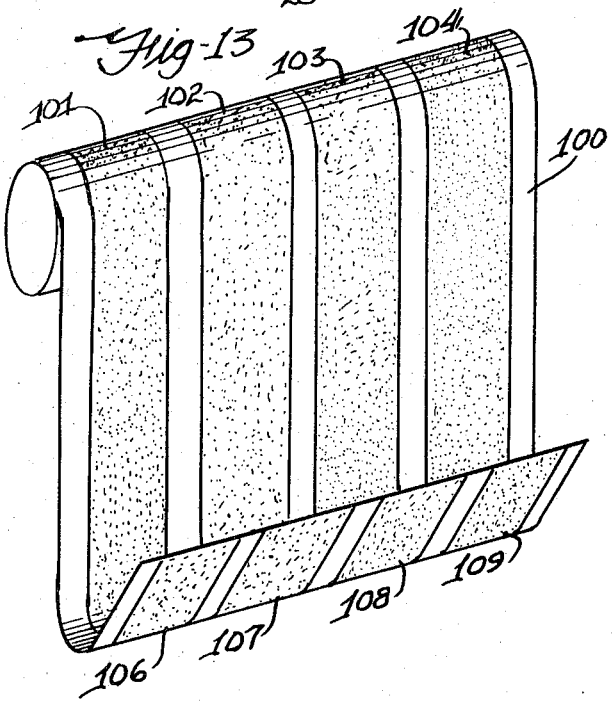
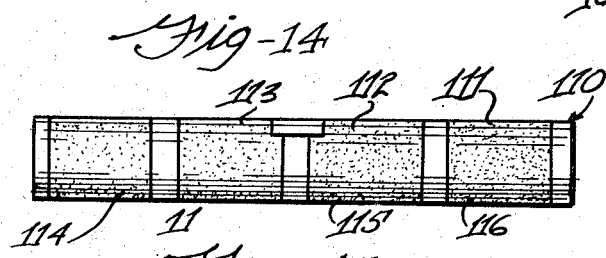
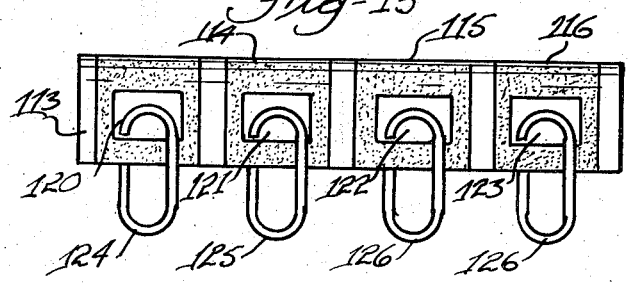
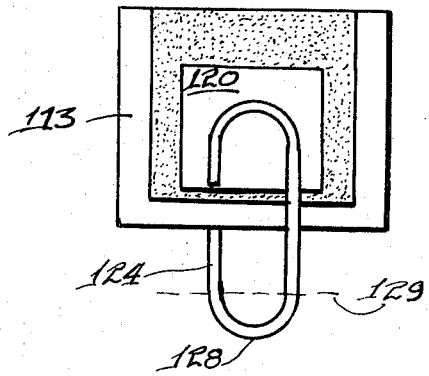

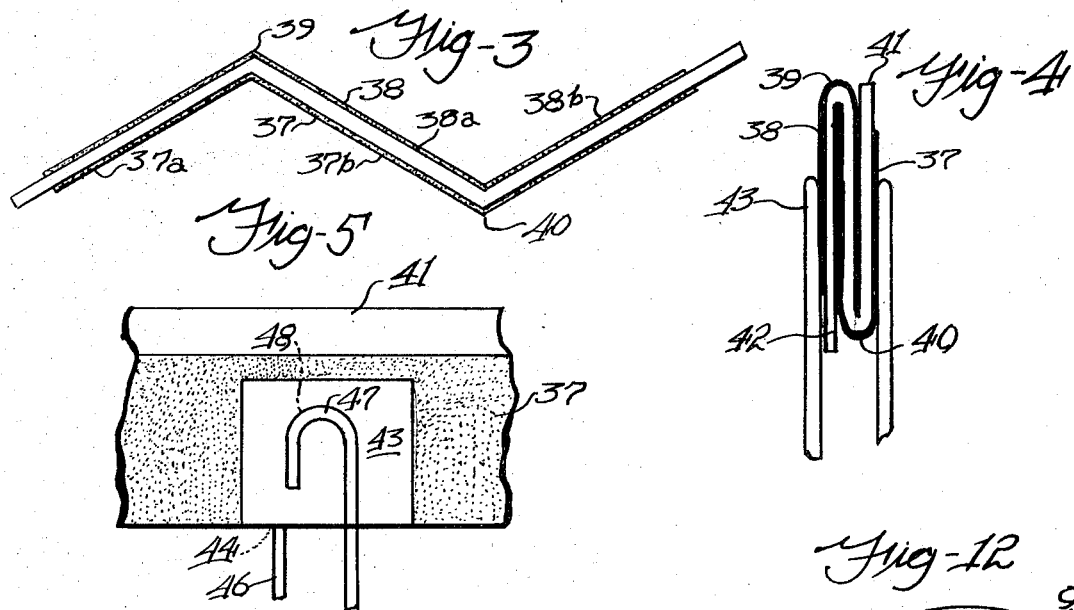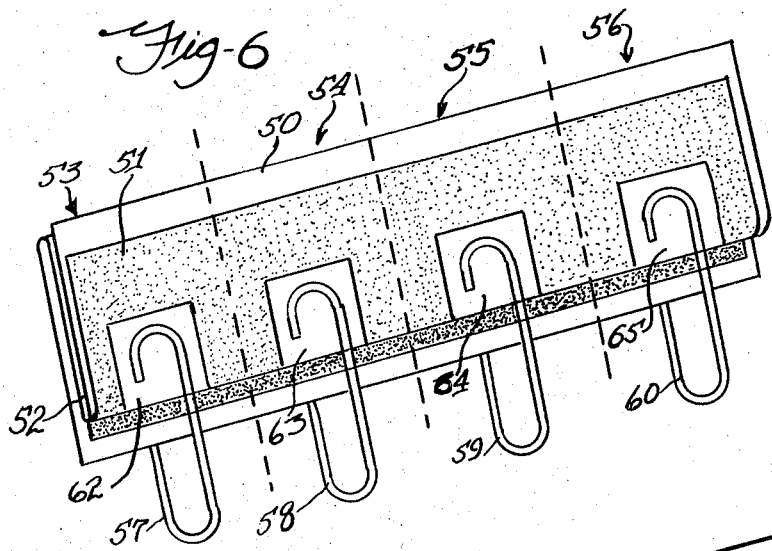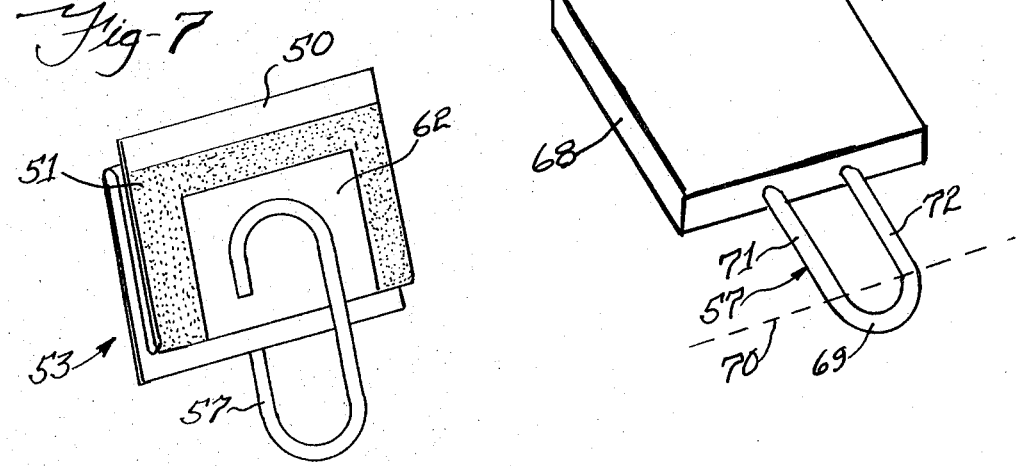

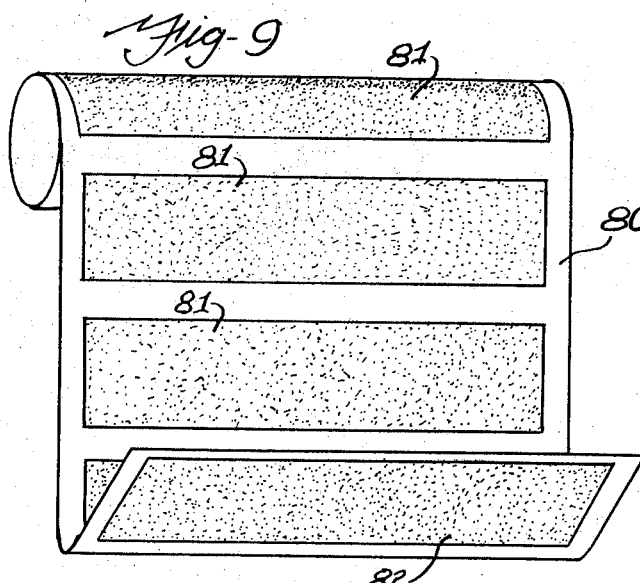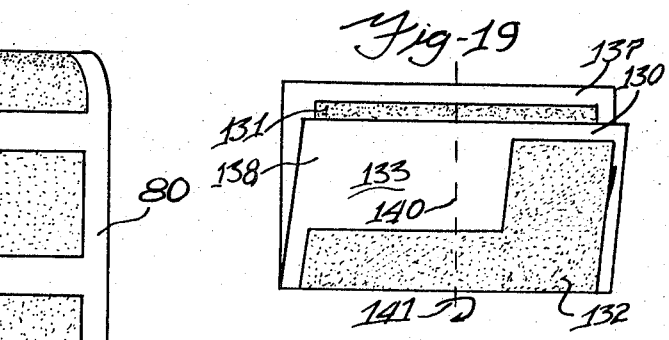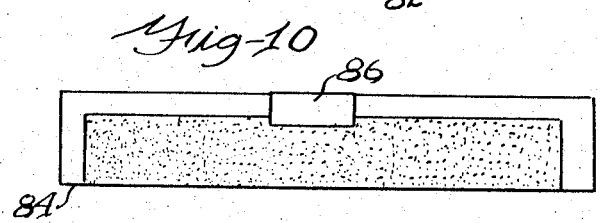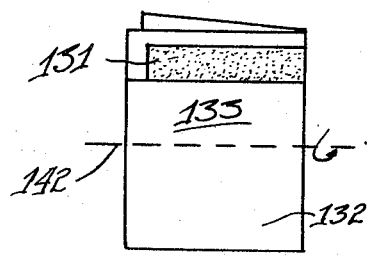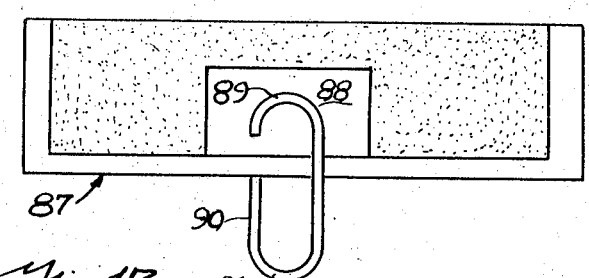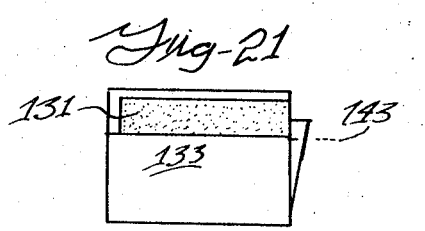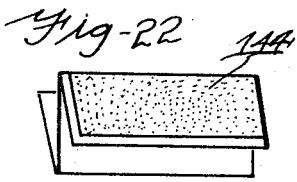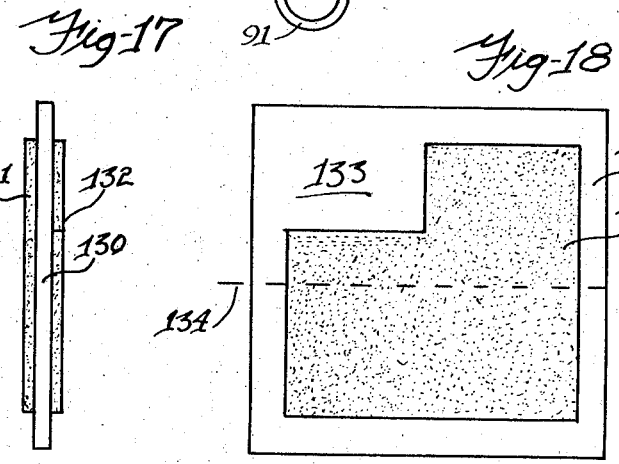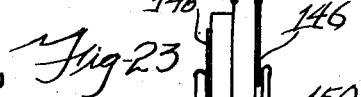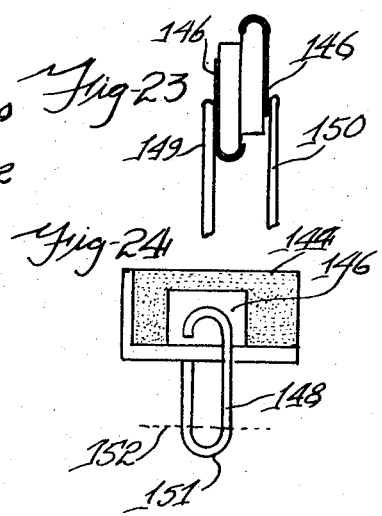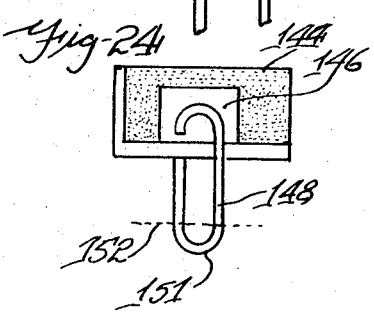

MINIATURE METALIZED FILM CAPACITOR

BACKGROUND OF THE INVENTION

This invention relates generally to capacitors, and more particularly to improved double-sized metalized capacitors and a method of manufacturing the same.

Capacitors folded on a line at their center and wound or wrapped from their centers about a mandrel are well-known in the prior art. The metalized coatings on the opposite sides of the dielectric strip form the respective diametrically opposed plates of the capacitor and, in some instances, may be offset in a transverse direction so that leads may be attached to the ends of common capacitor plates without causing short circuiting between the plates. Although there are many instances in the prior art where it has been proposed to use the lead wires as at least one of the winding mandrels of the capacitor, such devices generally require secondary operations which increase the cost and complexity of the manufacturing process. Examples of such capacitor constructions of the prior art are shown in U.S. Pat. No. 3,229,174 and German Pat. No. 886,634 wherein the lead members must be attached by adhesive or welding to the electrode foils of the capacitor before winding. Also, U.S. Pat. No. 2,790,607 shows an embodiment in which the winding takes place generally about a pair of wires but the wires are attached to the two separate metalized strips forming the capacitor by means of a thermoplastic adhesive and are designed to be removed after winding. Although this approach enables one of the wires to be utilized as a capacitor lead, it is not possible to use both of the wires in this manner.

SUMMARY OF THE INVENTION

It is an object of this invention to provide a wound metalized capacitor which may be smaller in size than previously available capacitors, and which may, if desired, have self-healing properties, be of substantially rigid construction, have stand-up leads which render it suitable for use in printed circuit boards, eliminate the presence of air in the electric field, and be suitable for simplified manufacturing techniques that will provide close tolerance mass production capacitors at a relatively low cost having a value in the order of about 100pf. to 0.01mfd.

It is another object of this invention to provide an improved method of making a double-sided metalized foil capacitor using the lead wires of the capacitor as a mandrel wherein the lead wires are formed with bight portions that engage double-sided metalized foil.

It is yet another object of this invention to provide a method of winding a metalized capacitor which requires only a very simple and economical winding apparatus and one in which the winding can continue without interruption for periodic checking of the value of the capacitor so being formed.

A still further object of this invention is to provide a wound capacitor and method of forming the same wherein only a single dielectric layer having the opposite surfaces thereof metalized is utilized and wherein metal foil, such as tin foil or aluminum foil, is utilized to insure proper electrical connection between the metalized surface and bight portions formed in the lead wire electrodes in contact therewith.

Briefly, the capacitor construction of this invention is formed by a single strip of double-sided metalized dielectric material which may be wound about an irregularly shaped electrode structure, which may have a shape resembling a common paper clip. The electrode structure also forms the mandrels which remain in place after a winding or folding so as to form the leads of the capacitor. The extended bight portion of the clip member is then severed to form electrically isolated spaced apart leads. The strip of metalized dielectric material may have unmetalized marginal portions on each side and, in one embodiment, is wound initially with a metal foil such as tin foil or aluminum foil in contact between the electrode-forming clip and the metalized surfaces. In another of the embodiments disclosed herein, the dielectric strip is folded at least twice and doubled back on itself, resulting in several layers of dielectric material separating the leads of the capacitor and protecting them against arcing inside the windings.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view of an elongated strip of dielectric material with metalized surfaces disposed on both sides thereof and with a piece of metal foil located between a clip-forming electrode member;

FIG. 1A is a plan view of the electrode-forming clip member, which is similar to a conventional paper clip;

FIG. 2 illustrates the elongated dielectric material and metalized surfaces thereof wound to form a wrapped capacitor;

FIG. 3 illustrates an edge view of the metalized dielectric material folded in a configuration to form a double layer between the clip-forming electrode members;

FIG. 4 is an end view of a capacitor folded in accordance with FIG. 3;

FIG. 5 is a side view of the structure of FIG. 4;

FIG. 6 illustrates a plurality of capacitors formed from a single elongated piece of dielectric material having its metalized surfaces folded over between the clip electrode members;

FIG. 7 illustrates a single capacitor formed from the plurality of capacitors located on the folded-over member of FIG. 6;

FIG. 8 is an encapsulated version of the capacitor of FIG. 7;

FIG. 9 illustrates a roll of dielectric sheet which has a plurality of spaced apart discrete metalized surfaces alternately formed thereon and is folded into a capacitor in accordance with the principles of this invention;

FIG. 10 is one form of folding the dielectric sheet capacitor of FIG. 9, here being illustrated as a roll;

FIG. 11 illustrates another form of folding the dielectric sheet of FIG. 9;

FIG. 12 illustrates a wound capacitor constructed in accordance with the principles of this invention by utilizing the configuration of FIG. 11;

FIG. 13 illustrates still another form of dielectric material having elongated discrete strips of metalized layers formed thereon;

FIG. 14 illustrates folding the capacitor-forming material of FIG. 11 in a particular configuration;

FIG. 15 illustrates placing the foil electrode-engaging members between the metalized surfaces and a plurality of spaced apart electrode-forming clip members;

FIG. 16 illustrates a single capacitor constructed by severing the plurality of capacitor forming areas of FIG. 15;

FIG. 17 is an edge view of a capacitor-forming double-sided metalized dielectric member;

FIG. 18 is a plan view of the capacitor-forming member of FIG. 17;

FIG. 19 illustrates the capacitor-forming member of FIG. 18 folded as illustrated;

FIG. 20 illustrates a second folded condition of the capacitor-forming member of FIG. 18;

FIG. 21 illustrates still another folded condition of the capacitor-forming member of FIG. 18;

FIG. 22 illustrates yet another folded condition of the capacitor-forming member of FIG. 18;

FIG. 23 is an edge view of the capacitor-forming member of FIGS. 19–22 folded to form a capacitor with the clip-forming member being in contact with the capacitor-forming member.

FIG. 24 is a side view of the capacitor of FIG. 23.

DETAILED DESCRIPTION OF THE ILLUSTRATED EMBODIMENTS

Referring now to FIG. 1, there is seen a plastic film dielectric member 10 of substantially rectangular configuration and including metalized surfaces 11 and 12 deposited on both sides thereof. In the illustrated embodiment the metalized surfaces 11 and 12 are spaced from the edge portions 13 and 14 to provide free margins 16 and 17, respectively, along the entire length of the plastic dielectric film 10. A thin foil member 18 is placed in contact with both metalized surfaces 11 and 12 which may be of a conductive metal such as aluminum foil or a tin foil member, or the like. Placed in contact with the foil members 18 is a clip member constructed in accordance with the principles of this invention and designated generally by reference numeral 20. Most advantageously, the clip member 20 is fashioned substantially similar to that of a conventional paper clip.

Referring particularly to FIG. 1A, the clip member 20 is constructed to have relatively close spaced apart bight portions 21 and 22 which are integrally formed with electrical contact portions 23, 24 and 26, 27. This construction insures a more positive electrical contact with the plates of the capacitor. The lead member 23 and the lead member 27 extend downwardly, as seen in FIG. 1A, and come together at a bight portion 28 which extends from the capacitor-forming unit during the construction thereof.

Referring now to FIG. 2, there is seen a wound capacitor construction designated generally by reference numeral 30 and which is formed by the components illustrated in FIG. 1. The wound capacitor 30 has the clip member 20 thereof rotated as a mandrel to form a somewhat oval-shaped capacitor in the cross section. The bight portion 28 of the clip 20 is severed along the broken line 31 to provide a pair of spaced apart lead wire connectors 32 and 33 which are in electrical contact with the metalized surfaces 11 and 12 illustrated in FIG. 1. The lead wire connectors 32 and 33 are then readily adaptable for insertion into apertures formed in printed circuit boards, or the like.

Referring now to FIG. 3, there is seen an alternate arrangement of folding the dielectric sheet material with the metalized surfaces formed thereon. In this instance, the dielectric plastic film is designated generally by reference numeral 36 and has metalized surfaces 37 and 38 formed on opposite sides thereof. The edge view illustrated in FIG. 3 is provided with a pair of bend portions 39 and 40 thereby folding the capacitor-forming sheet members in such a manner to have the metalized surface 37 fold upon itself in electrical contact in two sections 37a and 37b. In like manner, the metalized surface 38 is folded upon itself in two sections 38a and 38b, thereby providing a more compact unit having substantially the same electrical capacitance characteristics.

FIGS. 4 and 5 illustrate the folded configuration of the capacitance elements of FIG. 3 and show the marginal edge portions 41 and 42 located at the top and bottom portions of the capacitor, respectively, as seen from the end view of FIG. 4. A pair of spaced apart foil members 43 and 44, on opposite sides of the capacitor structure, are placed in the central region thereof and arranged to receive the bight portions of a clip member 46. In this instance the bight portions 47 engage the foil 43 while a bight portion 48 engages the foil 44. The bight portions may be substantially of the same length and radius so they may be superimposed directly upon one another, in contradistinction to the paper clip type structure illustrated in FIGS. 1 and 2, if desired.

Referring now to FIGS. 6, 7 and 8, there is seen still another alternate embodiment of the present invention. Here a sheet of plastic film dielectric material 50 is folded substantially as illustrated in FIGS. 3, 4 and 5 and has spaced apart metalized surfaces 51 and 52 located on opposite sides thereof. The plastic film dielectric member 50 is divided into a plurality of discrete capacitor areas 53, 54, 55 and 56, thereby providing a plurality of capacitors of substantially the same capacitance value from a single production step. A plurality of spaced apart clip members 57, 58, 59 and 60 are placed in registry with the capacitance members 53, 54, 55 and 56, respectively. The clip members 57–60 have their adjacent bight portions placed on opposite sides of the capacitance elements while the bight portion located at the extended end thereof is arranged to extend from the capacitance element a distance sufficient to be severed to form a pair of spaced apart electrical leads. As mentioned above, each of the capacitor elements 53–56 is provided with foil members 62, 63, 64 and 65 to provide a more positive electrical contact between the bight portion of the clip members and the metalized surfaces.

In FIG. 7 the capacitor 53 is illustrated as being severed from the remainder of the capacitors illustrated in FIG. 6. In this configuration, the capacitor is substantially rectangular in configuration and, as illustrated in FIG. 8, can be encapsulated by a suitable encapsulating material as indicated by reference numeral 68. The clip member 57 has the bight portion 69 thereof severed along a cut line 70 to provide a pair of spaced apart electrical lead connections 71 and 72. As mentioned above, these lead connections 71 and 72, are suitable for insertion through a printed circuit board for soldering to the printed circuit on the opposite side thereof.

Referring now to FIGS. 9, 10, 11 and 12, there is seen still another alternate form of construction of a capacitor constructed in accordance with the principles of this invention. Here a continuous roll of dielectric plastic material 80 is provided with a plurality of horizontally disposed spaced apart metalized surface areas 81 located on one side thereof and a corresponding plurality of metalized horizontally disposed spaced apart areas 82 located on the opposite side thereof. The continuous roll of dielectric material 80 can be rolled or folded into discrete capacitor-forming units as indicated by reference numeral 84 in FIG. 10. In this instance, the folded condition of the capacitor-forming unit is maintained by a small piece of tape 86 located substantially centrally thereof.

When the capacitor-forming unit is formed as a folded over member as indicated by reference numeral 87, FIG. 11, the opposing side surfaces of metalized layers may be provided with foil members 88 upon which the bight portions 89 of the clip 90 can engage. The clip 90 has an outwardly directed bight portion 91 which is severed along sever line 92, as illustrated in FIG. 12. The member 87 is wound to form a capacitor 93 in the manner set forth hereinabove. The capacitor 93 may also be encapsulated, if desired, by any suitable encapsulating means, if desired.

Referring now to FIGS. 13, 14, 15 and 16, there is seen still another alternate form of capacitor constructed in accordance with the principles of this invention. Here a continuous roll 100 of plastic dielectric film material is provided with a plurality of spaced apart longitudinally disposed metalized surfaces 101, 102, 103 and 104 with corresponding metalized surfaces 106, 107, 108 and 109, respectively, located on opposite sides of the plastic film 100.

The roll of dielectric material 100, together with the elongated metalized surfaces thereon, can be wound in individual units as indicated by reference numeral 110, FIG. 14, and the terminating edge 111 thereof is held in place by a small piece of tape 112. The tape may be removed at a later time, if desired. The individual metalized pairs of surfaces indicated generally by reference numerals 113, 114, 115 and 116 can be severed along cut lines 117, 118 and 119, as best seen in FIG. 15, to provide a plurality of discrete capacitor units. In this instance, the capacitors are provided with the foil members 120, 121, 122 and 123 to engage the bight portions of the corresponding clip members 124, 125, 126 and 127.

One of the individual capacitor units of FIG. 15 is illustrated in FIG. 16. The bight portion 128 of this capacitor is removed from the clip member 124 by cutting along the sever line 129. This individual capacitor unit may also be encapsulated by any suitable means such as potting compound such as epoxy resins or the like, if desired.

Referring now to FIGS. 17–24, there is seen still another alternate capacitor construction and method of making the same in accordance with the principles of this invention. FIG. 17 illustrates a side view of dielectric plastic film member 130 having metalized surfaces 131 and 132 formed on opposite sides thereof. In this embodiment the metalized surface 132, as best seen in FIG. 18, is provided with a cut-out or void area 133 so that during construction the bight portion of the clip will engage only one metalized surface when the dielectric film is folded in a manner set forth hereinbelow.

As seen in FIG. 18, the dielectric film 130, together with the metalized surfaces formed thereon, are folded along the line 134 in a direction as indicated by the curved arrow 136. That is, the bottom portion of the dielectric film is urged rearwardly of the viewer and then brought upwardly so that a top margin portion 137 extends above the top margin portion 138 of the forward portion. This is best illustrated in FIG. 19. A second fold line 140 provides the right hand section, as seen by the viewer, to be folded backwardly and behind the left hand portion as indicated by the arrowed line 141. The dielectric material and metalized surfaces are again folded along fold line 142, as indicated by the arrow 145 in FIG. 20, so as to bring the bottom portion rearwardly of the viewer, as indicated in FIG. 21. The unit is then again folded along fold lines 143 and 147 to form the small capacitor unit of FIG. 22 which has exposed metalized surfaces on both sides thereof but which are completely electrically insulated from one another. The capacitor so formed in FIG. 22 is designated generally by reference numeral 144 and receives contact foil members 146 on opposite sides thereof, as best seen in FIGS. 23 and 24. Also, a clip lead member 148 for the capacitor has the opposite bight portions 149 and 150 thereof in contact with the foil members 146, and the bight portion 151 is cut away along cut line 152.

While several embodiments of the specific invention have been illustrated herein, it will be understood that still further modifications and variations may be effected without departing from the spirit and scope of the novel concepts disclosed and claimed herein.

The invention is claimed as follows:

1. A capacitor comprising at least one flexible dielectric layer, at least one first and one second flexible conductive layer disposed on opposite sides of said dielectric layer, an elongated conductive clip member having a looped end that extends externally of said flexible layers and forms a bight portion that may be removed, first and second substantially straight lead portions which are integral with said looped end and which normally are coplaner and which have first and second reverse bend bight portions that are integral with the inner ends of said first and second lead portions, respectively, said first and second reverse bend bight portions being biased toward each other so that they must be forced apart to receive said flexible layers therebetween, a first thin conductive foil piece positioned between said first conductive layer and said first reverse bend bight portion and a second thin conductive foil piece positioned between said second conductive layer and said second reversed bend portion, said foil pieces thereby being secured in place by the natural resiliency of said clip member when said flexible layers are positioned between said reverse bend bight portions and the force tending to separate said bight portions is removed.

2. A capacitor as claimed in claim 1 wherein said flexible layers are wound about said lead portions to form a wound capacitor.

3. A capacitor as claimed in claim 1 wherein a plurality of said flexible dielectric and conductive layers are overlapped to increase the total capacitance of the capacitor so formed.

4. A capacitor as claimed in claim 1 wherein said flexible layers and said clip member, with the exception of a portion of said lead members and said looped end, are encapsulated.

5. A capacitor as claimed in claim 4 wherein a plurality of said flexible dielectric and conductive layers are overlapped to increase the total capacitance of the capacitor so formed.

* * * * *

UNITED STATES PATENT OFFICE
CERTIFICATE OF CORRECTION

Patent No. 3,854,075          Dated Dec. 10, 1974

Inventor(s) JOHN PHILLIP UHL

It is certified that error appears in the above-identified patent and that said Letters Patent are hereby corrected as shown below:

correct the spelling of Applicant's name from

John Phillip Uhi to  -  John Phillip Uhl -.

Signed and Sealed this twenty-fourth Day of February 1976

[SEAL]

Attest:

RUTH C. MASON
*Attesting Officer*

C. MARSHALL DANN
*Commissioner of Patents and Trademarks*